United States Patent
Ando et al.

(10) Patent No.: US 7,592,805 B2
(45) Date of Patent: Sep. 22, 2009

(54) MAGNETIC DETECTION DEVICE HAVING BRIDGE CIRCUIT PROVIDED WITH RESISTANCE ADJUSTMENT PORTION AND METHOD OF MANUFACTURING THE SAME

(75) Inventors: Hideto Ando, Niigata-ken (JP); Hideki Gochou, Niigata-ken (JP); Motoki Hirayama, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 93 days.

(21) Appl. No.: 11/679,015

(22) Filed: Feb. 26, 2007

(65) Prior Publication Data
US 2008/0054888 A1    Mar. 6, 2008

(30) Foreign Application Priority Data
Aug. 31, 2006    (JP)    ............................. 2006-236475

(51) Int. Cl.
*G01R 33/02* (2006.01)
(52) U.S. Cl. ..................................................... 324/252
(58) Field of Classification Search ................. 257/414, 257/421; 324/252, 207.21; 338/32 R
See application file for complete search history.

(56) References Cited

U.S. PATENT DOCUMENTS

| | | | | |
|---|---|---|---|---|
| 4,480,248 A | * | 10/1984 | Sudo et al. ................. | 338/32 R |
| 4,954,216 A | * | 9/1990 | Hunter et al. ................. | 216/22 |
| 5,561,368 A | * | 10/1996 | Dovek et al. ................. | 324/252 |
| 5,585,719 A | * | 12/1996 | Endo et al. .................... | 324/235 |
| 6,069,476 A | * | 5/2000 | Vieux-Rochaz et al. ..... | 324/252 |
| 2006/0087318 A1 | * | 4/2006 | Crolly et al. ................. | 324/252 |

FOREIGN PATENT DOCUMENTS

JP    2001-167902    6/2001

* cited by examiner

*Primary Examiner*—Jay M Patidar
(74) *Attorney, Agent, or Firm*—Brinks Hofer Gilson & Lione

(57) ABSTRACT

In a magnetic detection device using a magnetic resistance element, the resistance of a layer having a multi-layer structure can be easily adjusted without causing damages to the layer. A magneto-resistance layer is connected in series to a reference resistance layer, and a magneto-resistance layer is connected in series to a reference resistance layer on a substrate. A voltage is applied between a power supply layer and a grounding layer. A first output conductive layer and the reference resistance layer extend in parallel to each other so that they are partially electrically connected to each other via a connection layer. A second output conductive layer and the reference resistance layer extend in parallel to each other so that they are partially electrically connected to each other via a connection layer. Accordingly, it is possible to adjust the resistance of the reference resistance layers by selecting the respective positions of the connection layers.

2 Claims, 7 Drawing Sheets

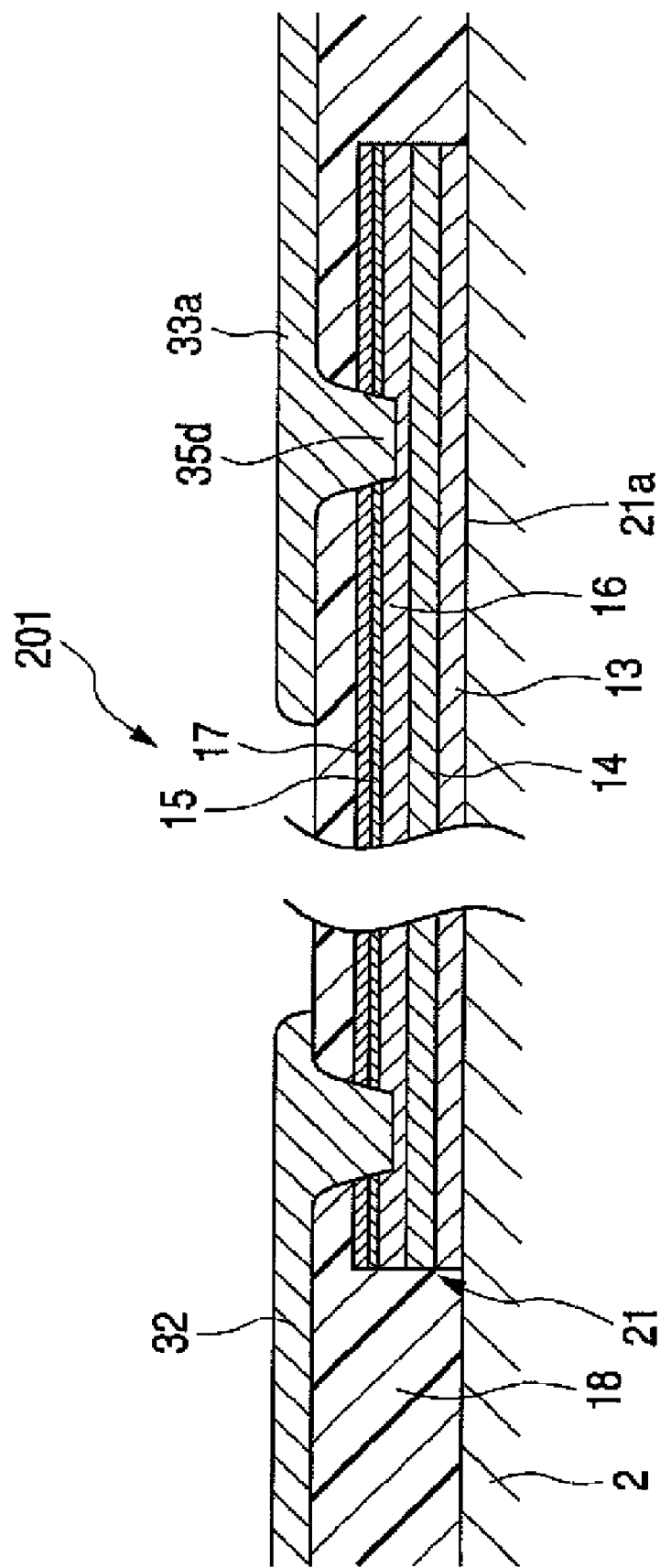

MAGNETIC DETECTION DEVICE HAVING BRIDGE CIRCUIT PROVIDED WITH RESISTANCE ADJUSTMENT PORTION AND METHOD OF MANUFACTURING THE SAME

This patent document claims the benefit of Japanese Patent Application No. 2006-236475 filed on Aug. 31, 2006, which is hereby incorporated by reference.

BACKGROUND

1. Field

The present invention relates to a magnetic detection device for detecting an external magnetic field by using a magneto-resistance element, and more particularly, to a magnetic detection device for detecting a magnetic field with high precision by adjusting a resistance, and also relates to a method of manufacturing the magnetic detection device.

2. Description of the Related Art

Generally, when a variable resistance layer of which the resistance varies with an external environment is used to detect a variation of the external environment, the variable resistance layer is connected in series to a reference resistance layer of which the resistance does not vary, and a voltage is applied to the variable resistance layer and the reference resistance layer connected in series to each other. A central potential between the variable resistance layer and the reference resistance layer is detected so as to detect a variation of the resistance of the variable resistance layer without being greatly influenced by environmental temperature.

In such type of detection device, it is necessary to adjust the resistance of the reference resistance layer so as to adjust the central potential between the variable resistance layer and the reference resistance layer, and it is preferable to adjust the resistance of the reference resistance layer so as to set the central potential equal to a one-half of a supply voltage.

In general, in order to adjust the resistance of the reference resistance layer, after forming the reference resistance layer, the reference resistance layer is trimmed so that the resistance thereof is set to a desired resistance.

JP-2001-167902 is an example of the related art.

However, when the resistance of the reference resistance layer is adjusted through the trimming process, the adjustment process thereof is complicated. When the reference resistance layer is formed of a single material layer, the reference resistance layer should not be damaged by the trimming process.

However, when the resistance layer of which the resistance is to be adjusted is a magneto-resistance layer having a multi-layer structure, or the reference resistance layer of which the resistance is to be adjusted so that the resistance is equal to that of the magneto-resistance layer also has the multi-layer structure as in the case of the magneto-resistance layer, too much stress is applied between each of the layers in the multi-layer structure at the time of trimming the resistance layer. Accordingly, the structure of the resistance layer may be partially destroyed, thereby changing a temperature characteristic and thus deteriorating a magneto-resistance effect.

SUMMARY

The present embodiments may solve the above-mentioned problems. An object of the invention is to provide a magnetic detection device and a method of manufacturing the same, in which the resistance is freely adjustable and a resistance layer of which the resistance has been adjusted is not damaged.

According to an aspect of the invention, there is provided a magnetic detection device in which a magneto-resistance layer of which the electric resistance varies with an external magnetic field is connected in series to a reference resistance layer of which the electric resistance does not vary with the external magnetic field. A voltage is applied to the magneto-resistance layer and to the reference resistance layer, which are connected in series to each other. An output conductive layer for obtaining a central potential between the magneto-resistance layer and the reference resistance layer is provided, wherein the output conductive layer extends in a longitudinal direction of at least one of the magneto-resistance layer and the reference resistance layer, and is parallel to at least one of the magneto-resistance layer and the reference resistance layer with a gap therebetween. The output conductive layer is electrically connected to at least one of the magneto-resistance layer and the reference resistance layer via a conductive connection layer, and the position of the connection layer is selectable.

For example, the output conductive layer and at least one of the magneto-resistance layer and the reference resistance layer are disposed with a gap therebetween in a width direction of the layers, or the output conductive layer overlaps with at least one of the magneto-resistance layer and the reference resistance layer, with a gap therebetween in a thickness direction of the layers.

According to another aspect of the invention, there is provided a magnetic detection device in which a first magneto-resistance layer having an electric resistance that varies with an external magnetic field, is connected in series to a second magneto-resistance layer of which the electric resistances also varies with the external magnetic field. A voltage is applied to the first magneto-resistance layer and the second magneto-resistance layer, and an output conductive layer for obtaining a central potential between the first magneto-resistance layer and the second magneto-resistance layer is provided, wherein the output conductive layer extends along a longitudinal direction of at least one of the first magneto-resistance layer and the second magneto-resistance layer with a gap therebetween The output conductive layer is electrically connected to at least one of the first magneto-resistance layer and the second magneto-resistance layer via a conductive connection layer, and wherein the position of the connection layer is selectable.

For example, the output conductive layer and at least one of the first magneto-resistance layer and the second magneto-resistance layer are disposed with a gap therebetween in a width direction of the layers, or the output conductive layer overlaps with at least one of the first magneto-resistance layer and the second magneto-resistance layer, with a gap therebetween in a thickness direction of the layers.

In the magnetic detection device of the invention, the magneto-resistance layer has a fixed magnetic layer of which the magnetization direction is fixed, a free magnetic layer of which the magnetization direction varies with the external magnetic field, and a non-magnetic conductive layer disposed between the fixed magnetic layer and the free magnetic layer, and the non-magnetic conductive layer and the free magnetic layer are laminated in a reverse order in the reference resistance layer in comparison with the magneto-resistance layer.

In the invention, when the first magneto-resistance layer has a magnetic field in a first direction and the electric resistance thereof varies, and when the first magneto-resistance layer has a magnetic field in a second direction opposite to the first direction, the electric resistance thereof does not vary. When the second magneto-resistance layer has a magnetic field in a second direction, the electric resistance thereof varies, and when the second magneto-resistance layer has a magnetic field in a first direction, the electric resistance thereof does not vary.

In the invention, the reference resistance layer having the multi-layer structure or the magneto-resistance layer having the multi-layer structure is not trimmed to provide the connection layer thereon so as to adjust the resistance. Therefore, deterioration of characteristics of the layers after the adjustment of the resistance can be prevented.

According to a further aspect of the invention, there is provided a method of manufacturing a magnetic detection device in which a magneto-resistance layer of which the electric resistance varies with an external magnetic field is connected in series to a reference resistance layer of which the electric resistances does not vary with the external magnetic field. An output conductive layer is formed to obtain a central potential between the magneto-resistance layer and the reference resistance layer, wherein the output conductive layer extends along in a longitudinal direction of at least one of the magneto-resistance layer and the reference resistance layer with a gap therebetween, and wherein the output conductive layer is electrically connected to at least one of the magneto-resistance layer and the reference resistance layer via a conductive connection layer of which the position is selectable.

According to a still further aspect of the invention, there is provided a method of manufacturing a magnetic detection device in which first magneto-resistance layers of which the electric resistance varies with an external magnetic field is connected in series to a second magneto-resistance layer of which the electric resistance does not vary with the external magnetic field. An output conductive layer is formed to obtain a central potential between the first magneto-resistance layer and the second magneto-resistance layer, wherein the output conductive layer extends in a longitudinal direction of at least one of the first magneto-resistance layer and the second magneto-resistance layer, and is parallel to at least one of the first magneto-resistance layer and the second magneto-resistance layer with a gap therebetween and wherein the output conductive layer is electrically connected to at least one of the first magneto-resistance layer and the second magneto-resistance layer via a conductive connection layer of which the position is selectable.

In the invention, the connection layer of which the position can be selected is provided between the resistance layer of which the resistance is adjusted and the facing output conductive layer, so as to easily adjust the resistance. Since the resistance layer is not trimmed, the resistance layer is protected from damage and the resistance can be adjusted without deteriorating the characteristics of the magneto-resistance.

BRIEF DESCRIPTION OF THE DRAWINGS

FIG. 9 is a cross-sectional view illustrating a modified example of the magnetic detection device according to embodiment 1.

DETAILED DESCRIPTION

Figure 1:
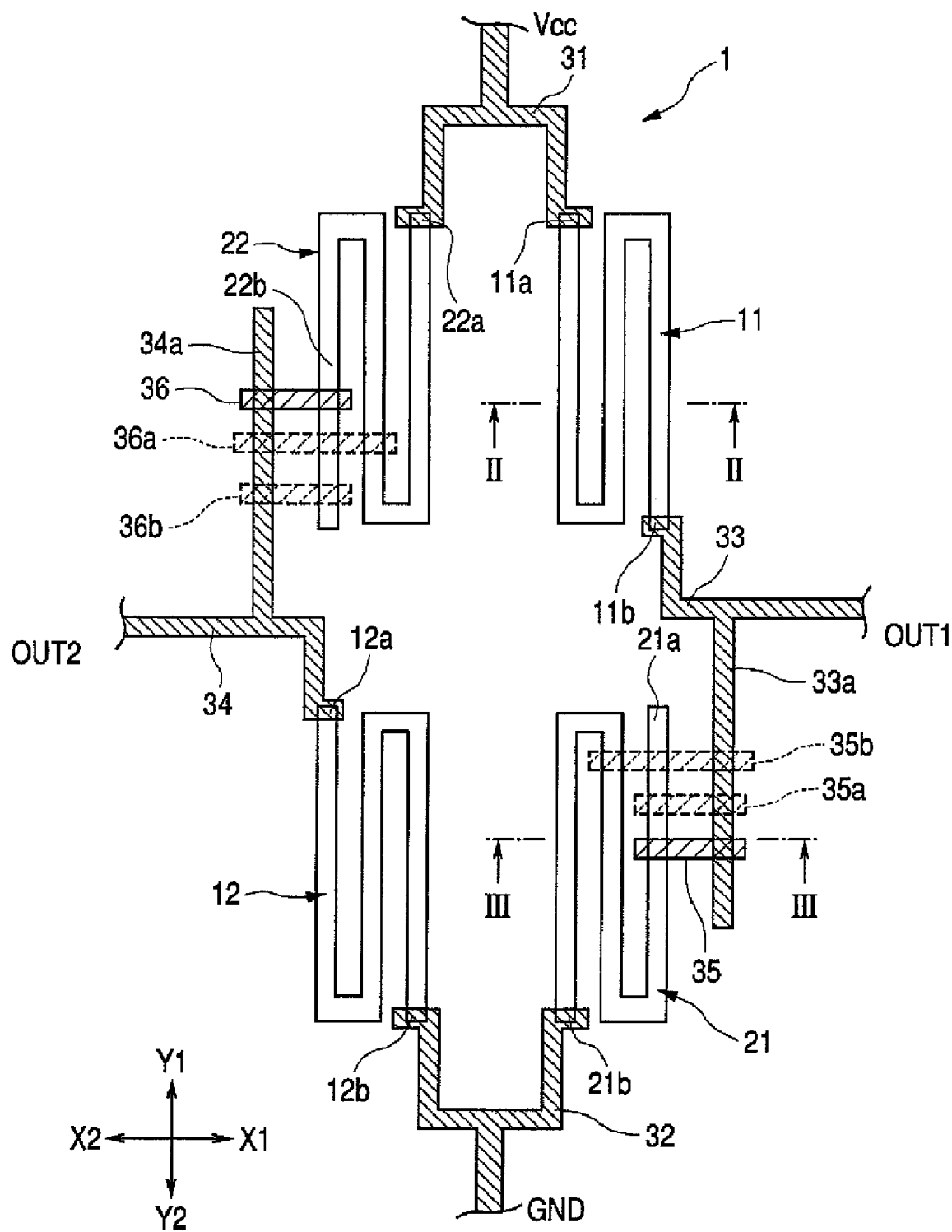
FIG. 1 is a plan view illustrating a magnetic detection device according to embodiment 1.
Figure 2:
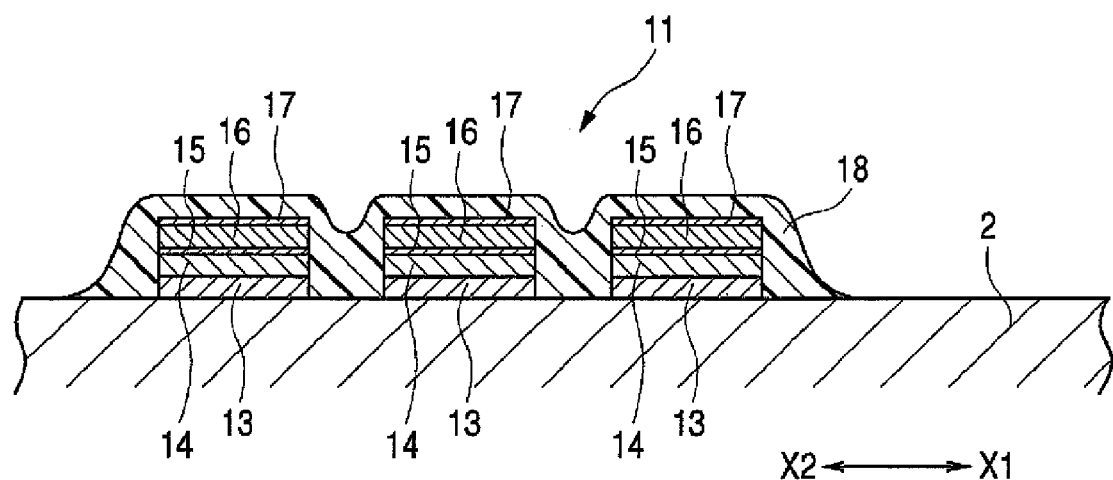
FIG. 2 is a cross-sectional view taken along the line II-II of FIG. 1.
Figure 3:
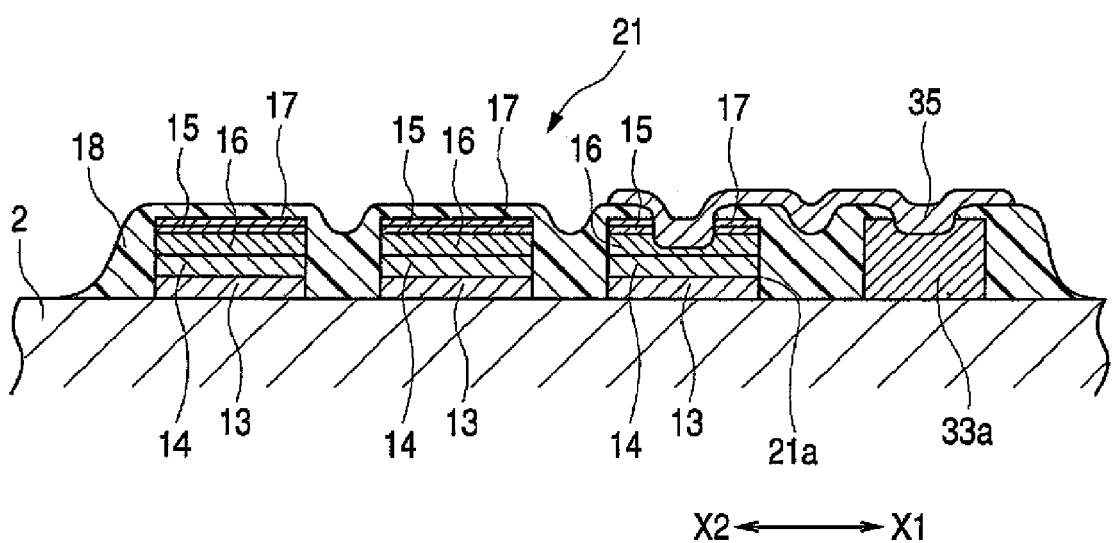
FIG. 3 is a cross-sectional view taken along the line III-III of FIG. 1.
Figure 5:
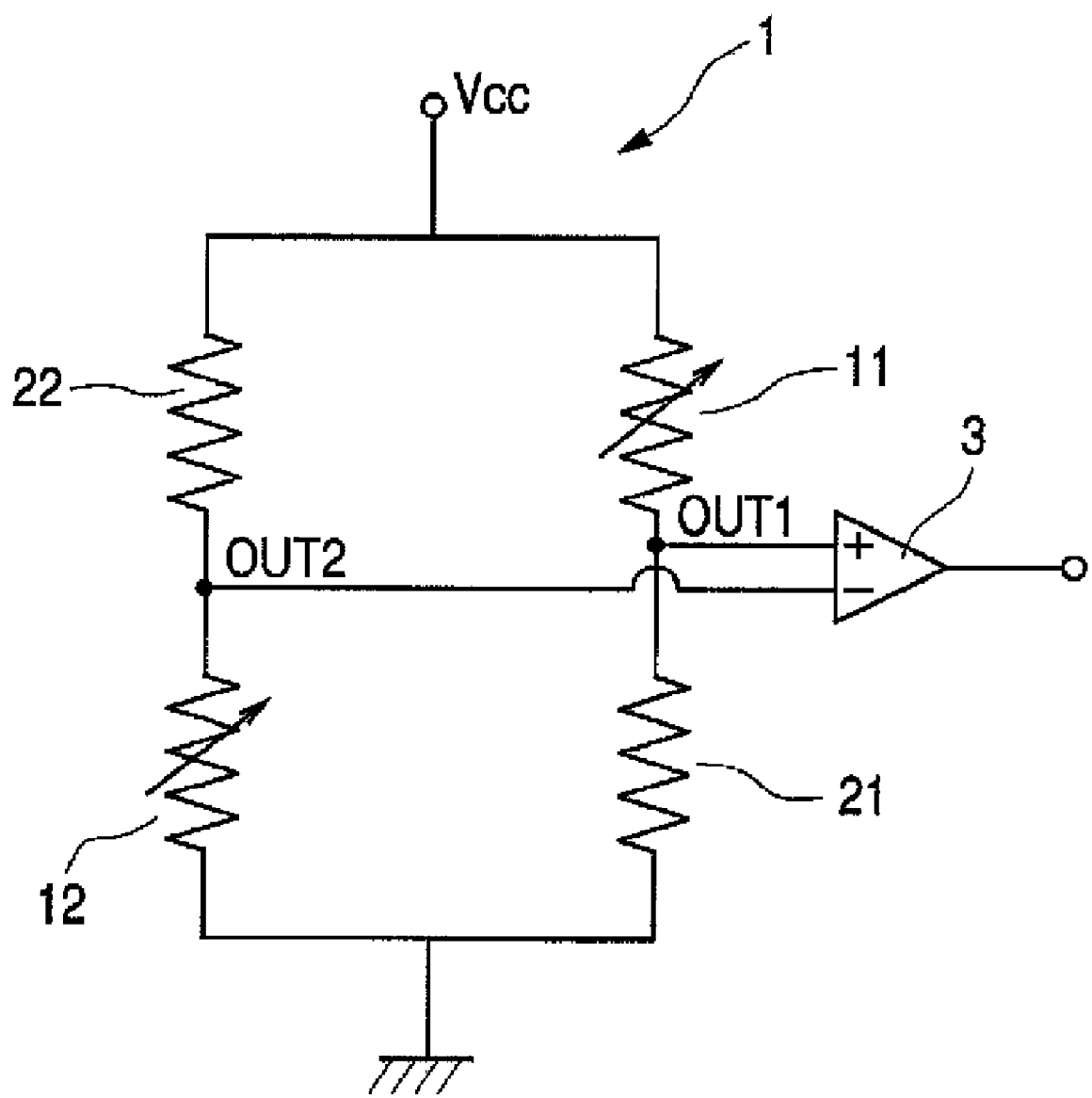
FIG. 5 is a circuit diagram of the magnetic detection device according to embodiment 1.

FIG. 1 is a plan view illustrating a magnetic detection device and a method of manufacturing the same according to embodiment 1 of the invention, FIG. 2 is an enlarged sectional view taken along the line II-II of FIG. 1, and FIG. 3 is an enlarged sectional view taken along the line III-III of FIG. 1. FIG. 5 is a circuit diagram of the magnetic detection device shown in FIG. 1.

In a magnetic detection device shown in FIGS. 1 and 5, a magneto-resistance layer 11 is connected in series to a reference resistance layer 21, and a magneto-resistance layer 12 is also connected in series to a reference resistance layer 22. A voltage is applied to the magneto-resistance layer 11 and the reference resistance layer 21, which are connected in series to each other, and a voltage is applied to the magneto-resistance layer 12 and the reference resistance layer 22, which are connected in series to each other. A first output (OUT1) can be obtained from a middle portion between the magneto-resistance layer 11 and the reference resistance layer 21, and a second output (OUT2) can be obtained from a middle portion between the magneto-resistance layer 12 and the reference resistance layer 22.

The magneto-resistance layer 11 has the same structure and planar pattern as those of the reference resistance layer 21. The planar patterns of the magneto-resistance layers 11 and 12 have a meandering or serpentine shape. The length thereof can be substantially increased to have a higher basic resistance.

As shown in FIG. 2, the magneto-resistance layers 11 and 12 have a multi-layer structure. The magneto-resistance layers 11 and 12 are formed by sequentially laminating an antiferromagnetic layer 13, a fixed magnetic layer 14, a non-magnetic conductive layer 15, and a free magnetic layer 16 on an entire substrate 2 of the magnetic detection device 1, and a surface of the free magnetic layer 16 is covered by a protective layer 17.

The antiferromagnetic layer 13 is formed of an antiferromagnetic material such as an Ir—Mn alloy (Iridium-Manganese alloy), the fixed magnetic layer 14 is formed of a soft magnetic material such as a Co—Fe alloy (Cobalt-Iron alloy), the non-magnetic conductive layer 15 is formed of Cu (Copper), the free magnetic layer 16 is formed of the soft magnetic material such as a Ni—Fe alloy (Nickel-Iron alloy), and the protective layer 17 is formed of Ta (Tantalum).

A magnetization direction of the fixed magnetic layer 14 is fixed in the magneto-resistance layers 11 and 12 by antiferromagnetic coupling between the antiferromagnetic layer 13 and the fixed magnetic layer 14. In this embodiment the magnetization direction of the fixed magnetic layer 14 is fixed in X2 direction. The fixed magnetic layer 14 is magnetically coupled to the free magnetic layer 16 with the non-magnetic conductive layer 15 interposed therebetween so that the magnetization direction of the free magnetic layer 16 is stabilized in the X2 direction when an external magnetic field is not applied.

Figure 7:
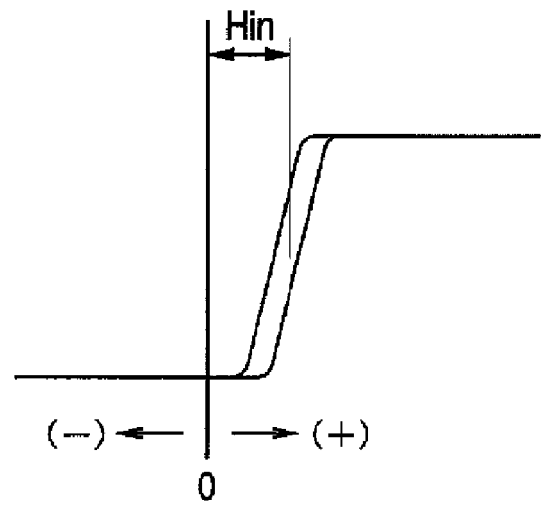
FIG. 7 is a characteristic diagram of a magneto-resistance layer according to embodiment 1.

FIG. 7 is a diagram of the magneto-resistance layers 11 and 12. An ordinate represents a resistance, and an abscissa represents a magnetic field direction. In the diagram, X1 direction is a positive direction of the magnetic field, and the X2 direction is a negative direction of the same. When the external magnetic field is applied to the magneto-resistance layers 11 and 12 in the negative direction, that is, in the X2 direction, the resistance of the magneto-resistance layers 11 and 12 does not vary. When the external magnetic field direction is applied to the magneto-resistance layers 11 and 12 in the positive direction, that is, in the X1 direction, and a magnetic field strength is greater than or equal to a predetermined value, the resistance increases.

When the resistance increases and then the magnetic field in the positive direction becomes weak, the resistance reduces. However, when the resistance increases or reduces, hysteresis is generated. The strength of the magnetic field in the middle of a hysteresis curve is represented by using Hin.

The reference resistance layer 21 has the same structure and the same planar pattern shape as those of the reference resistance layer 22. The planar pattern shapes of the reference resistance layers 21 and 22 have the meandering shape. As shown in FIG. 3, the reference resistance layers 21 and 22 have the same multilayer structure as the magneto-resistance layers 11 and 12, and materials and thicknesses of the layers in the reference resistance layers 21 and 22 is the same as those of the layers in the magneto-resistance layers 11 and 12. However, the non-magnetic conductive layer 15 and the free magnetic layer 16 are laminated in the reference resistance layers 21 and 22 in reverse order in comparison with that of the magneto-resistance layers 11 and 12, and layer structures of the reference resistance layers 21 and 22 are formed by sequentially laminating the antiferromagnetic layer 13, fixed magnetic layer 14, the free magnetic layer 16, the non-magnetic conductive layer 15, and the protective layer 17 on the substrate 2.

The reference resistance layers 21 and 22 and the magneto-resistance layers 11 and 12 are deposited on the same substrate 2 so that a magnetization direction of the fixed magnetic layer 14 in the reference resistance layers 21 and 22 is fixed in the X2 direction as the magneto-resistance layers 11 and 12. However, the free magnetic layer 16 is formed on the fixed magnetic layer 14 in the reference resistance layers 21 and 22 so that the resistance does not change even if the external magnetic field is applied.

Since the reference resistance layers 21 and 22 have the same layer structures and the same layer thicknesses as those of the magneto-resistance layers 11 and 12, the reference resistance layers 21 and 22 also have the same changes in the features thereof changed by environmental temperature and the like as the magneto-resistance layers 11 and 12.

As shown in FIG. 1, a power supply layer 31 is connected to one end 11a of the magneto-resistance layer 11 in Y1 direction and one end 22a of the reference resistance layer 22 in the Y1 direction. A grounding layer 32 is connected to the other end 12b of the magneto-resistance layer 12 in Y2 direction and the other end 21b of the reference resistance layer 21 in the Y2 direction. The grounding layer 32 is set to ground potential, and a predetermined supply voltage is applied between the grounding layer 32 and the power supply layer 31.

A first output conductive layer 33 is connected to the other end 11b of the magneto-resistance layer 11 in the Y2 direction and a second output conductive layer 34 is connected to the other end 12a of the magneto-resistance layer 12 in the Y1 direction. The power supply layer 31, the grounding layer 32, the first output conductive layer 33 and the second output conductive layer 34 have lower electric resistances than those of the magneto-resistance layers 11 and 12 and the reference resistance layers 21 and 22, and are formed of a copper layer, a silver layer, a gold layer, or conductive ink containing silver powders or gold powders.

As shown in FIG. 1, the reference resistance layer 21 formed in a meandering pattern has a linear portion 21a extending in the Y direction, and a part of the first output conductive layer 33 also has a linear portion 33a extending in the Y direction. The linear portion 21a of the reference resistance layer 21 is parallel to the linear portion 33a of the first output conductive layer 33 with a gap therebetween.

The linear portion 21a is connected to the linear portion 33a via a conductive connection layer 35. As indicated by reference numerals 35a and 35b in FIG. 1, a position of the connection layer 35 is selectable. As shown in FIGS. 2 and 3, the magneto-resistance layers 11 and 12 and the reference resistance layers 21 and 22 are covered by a cover layer 18. The cover layer 18 is nonmagnetic and nonconductive, and is formed of an inorganic material layer such as $SiO_2$ or $al_2O_3$ or an organic material layer.

As shown in FIG. 3, a part of the cover layer 18 is removed in a predetermined location, the connection layer 35 of a low-resistant conductive material is formed on the cover layer 18, and the linear portion 21a of the reference resistance layer 21 is electrically connected to the linear portion 33a of the first output conductive layer 33 via the connection layer 35. The connection layer 35 is formed of the same low-resistant conductive material as the first output conductive layer 33.

As shown in FIG. 1, the reference resistance layer 22 has a linear portion 22b extending in the Y direction, and the second output conductive layer 34 has a linear portion 34a extending also in the Y direction. The linear portion 22b is parallel to the linear portion 34a with a gap therebetween, and is electrically connected to the linear portion 34a via a connection layer 36 formed on the cover layer 18 as in the case of the connection layer 35. A position of the connection layer 36 is selectable. Accordingly, it is possible to dispose the connection layer 36 in positions indicated by reference numerals 36a and 36b.

In a process of manufacturing the magnetic detection device 1 shown in FIG. 1, multiple sets of the magnetic detection devices 1 shown in FIG. 1 are simultaneously deposited on the same substrate 2. At the same time, magneto-resistance layers for a monitor 11 and 12 and reference resistance layers 21 and 22 for a monitor are formed on the same substrate 2. Respective layers in the magneto-resistance layers for the monitor 11 and 12 and the reference resistance layers for the monitor 21 and 22 and the respective layers in the multiple sets of the magnetic detection devices 1 are deposited in the same process. Accordingly, the magneto-resistance layers 11 and 12 in the plurality of the magneto-resistance devices 1 have the same feature as that of the magneto-resistance layers for the monitor 11 and 12. It is the same in the case of the reference resistance layers 21 and 22 for the monitor.

Therefore, by measuring resistances of each of the magneto-resistance layers for the monitor 11 and 12 and each of the reference resistance layers for the monitor 21 and 22, it is possible to calculate desired resistances of the reference resistance layers 21 and 22. For example, the resistances of the magneto-resistance layers 11 and 12 are measured when the magnetic field is not applied, and the resistances of the reference resistance layers 21 and 22 are determined so that both of the first output conductive layer 33 and the second output conductive layer 34 have the central potential. A position in which the linear portion 21a is connected to the connection layer 35 and a position in which the linear portion 22b is connected to the connection layer 36 are calculated on the basis of the determined resistances.

On the basis of the calculated positions, the positions of the connection layers 35 and 36 are determined as the same positions in the magnetic detection devices 1 formed on the same substrate 2. As shown in FIG. 3, a part of the cover layer 18 corresponding to the determined positions is removed, and the connection layers 35 and 36 are formed thereon. In a process of removing the cover layer 18, a resist layer may be formed on a surface of the cover layer 18, exposure and development may be performed by a stepper to remove a part of the resist layer, and the cover layer 18 may be removed by milling or etching in the portion in which the resist layer is removed. Alternatively, the resist layer may be performed without performing the cover layer 18, the exposure and the development may be performed by the stepper to remove the part of the resist layer. The connection layers 35 and 36 may be deposited on the portion in which the resist layer is removed, and the cover layer 18 may be formed after depositing of the connection layers 35 and 36.

As indicated by reference numerals 35b and 36a in FIG. 1, the connection layer 35 can be electrically connected to a linear portion which is back of the linear portions 21a and 22b of the reference resistance layers 21 and 22.

When a magnetic field having a predetermined strength is externally applied to the magnetic detection device 1 shown in FIGS. 1 and 5 in the positive direction, and thus the resistances of the magnetic resistance layers 11 and 12 increases as shown in FIG. 7, a voltage of a first output (OUT1) decreases, a second output (OUT2) increases, and a voltage variation of twice the first output (OUT1) and the second output (OUT2) can be obtained by a differential amplifier 3. The magnetic field having a predetermined strength in the positive direction can be detected by switching ON-OFF output whether an output from the differential amplifier 3 is more than a predetermined value.

Figure 4:
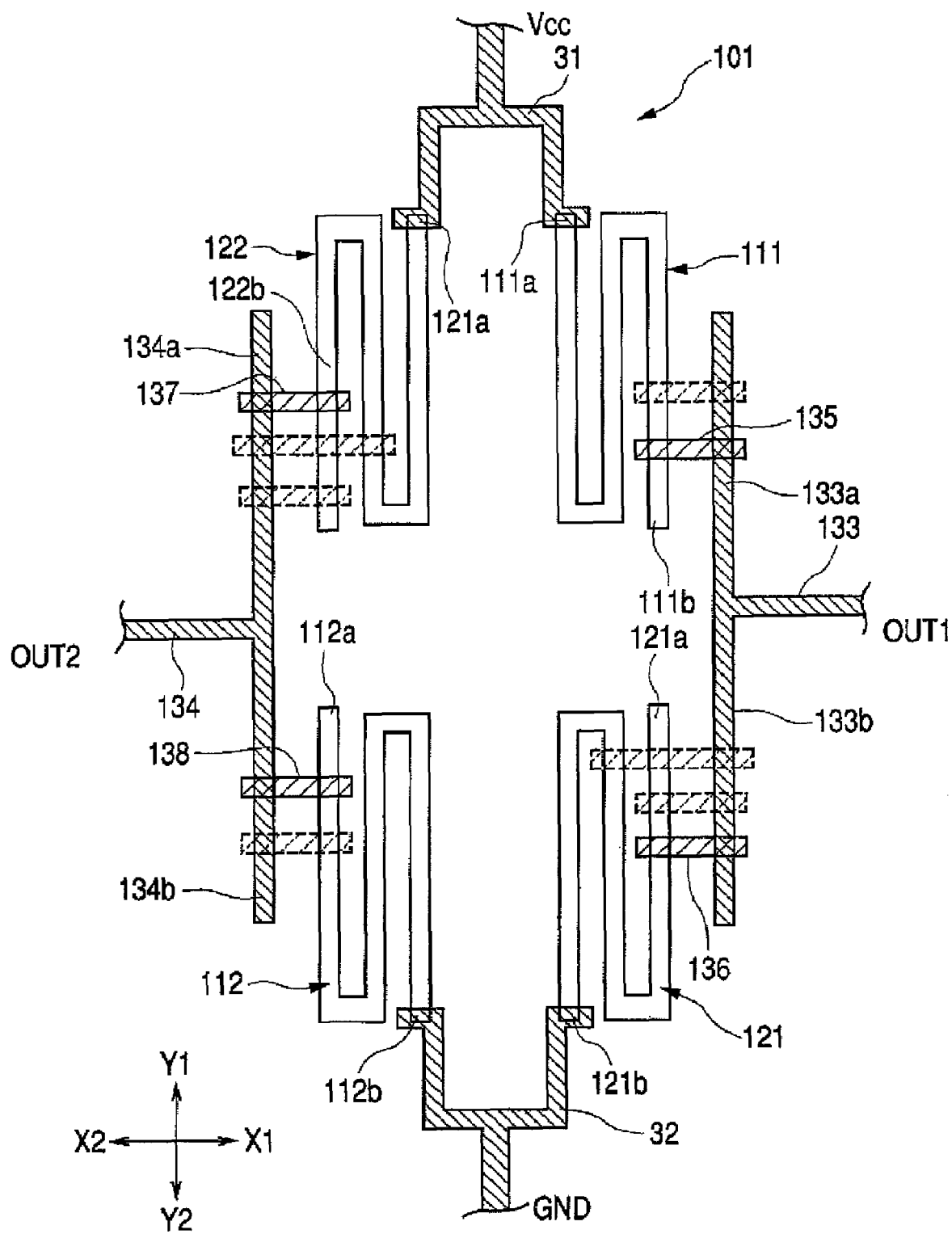
FIG. 4 is a plan view illustrating a magnetic detection device according to embodiment 2.
Figure 6:
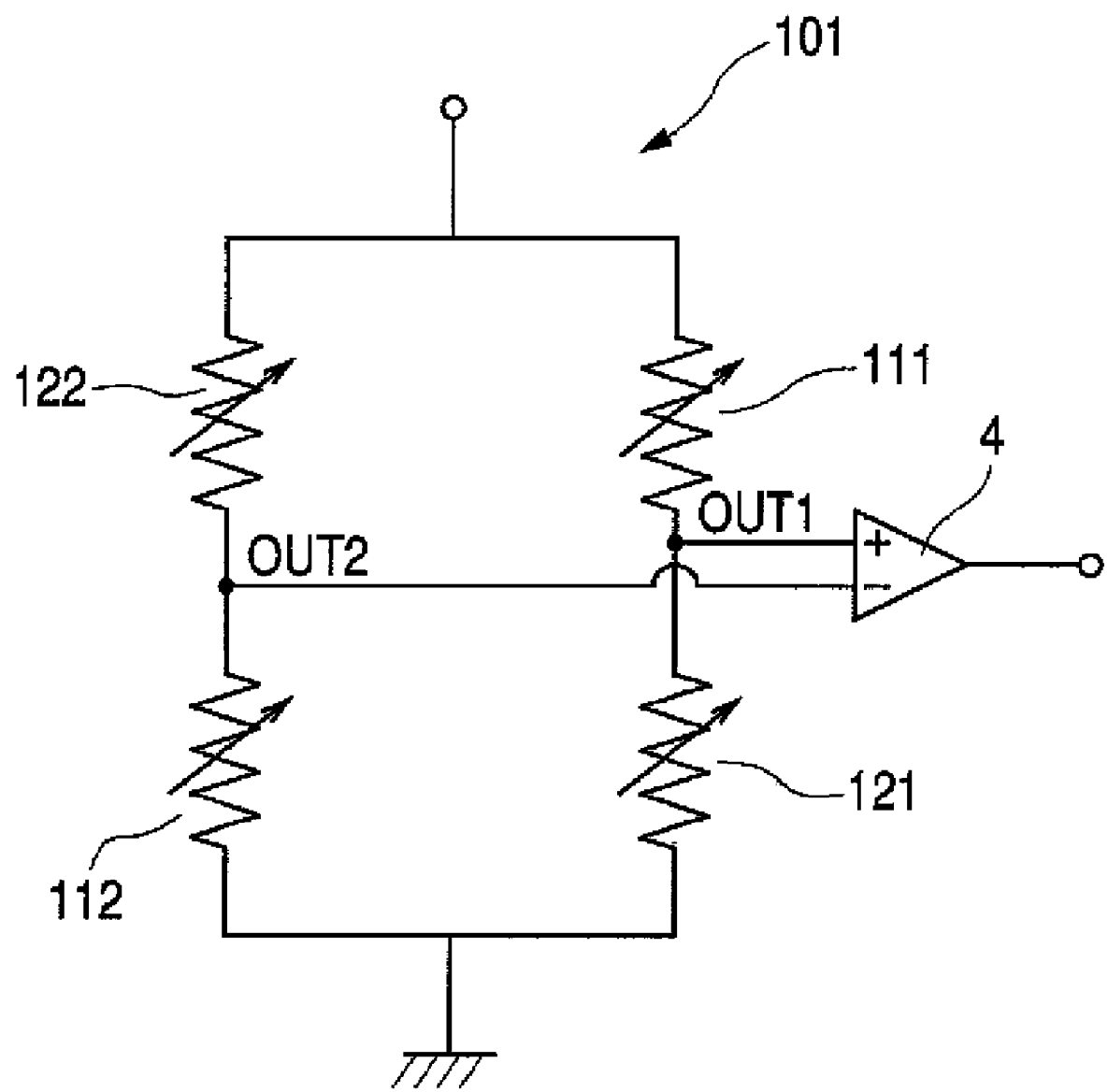
FIG. 6 is a circuit diagram of the magnetic detection device according to embodiment 2.

FIG. 4 is a plan view illustrating a magnetic detection device 101 of embodiment 2 of the invention. FIG. 6 is a circuit diagram of the magnetic detection device 101.

In the magnetic detection device 101, first magneto-resistance layers 111 and 112 and second magneto-resistance layers 121 and 122 are formed on the substrate 2. The first magneto-resistance layers 111 and 112 and the second magneto-resistance layers 121 and 122 are formed in the same meandering pattern as in the case of the magneto-resistance layers 11 and 12 and the reference resistance layers 21 and 22 shown in FIG. 1. The first magneto-resistance layers 111 and 112 and the second magneto-resistance layers 121 and 122 have the same layer structure as that shown in FIG. 2.

That is, both of the first magneto-resistance layers 111 and 112 and the second magneto-resistance layers 121 and 122 are formed by sequentially laminating the antiferromagnetic layer 13, the fixed magnetic layer 14, the non-magnetic conductive layer 15, the free magnetic layer 16 and the protective layer 17 on the substrate 2.

Magnetization directions of the fixed magnetic layers 14 is fixed in the negative direction, that is, in the X2 direction in all the first magneto-resistance layers 111 and 112 and the second magneto-resistance layers 121 and 122 by antiferromagnetic coupling between the antiferromagnetic layers 13 and the fixed magnetic layers 14. However, magnetization directions of the free magnetic layers 16 are stabilized in the negative direction in the first magneto-resistance layers 111 and 112, and are stabilized in the positive direction in the second magneto-resistance layers 121 and 122 when the external magnetic field is not applied.

For example, the thickness of the non-magnetic conductive layer 15 can be changed so that it is possible to set the magnetization direction of the fixed magnetic layer 14 in the negative direction and stabilize the magnetization direction of the free magnetic layer 16 in the positive direction or in the negative direction as described above.

Figure 8:
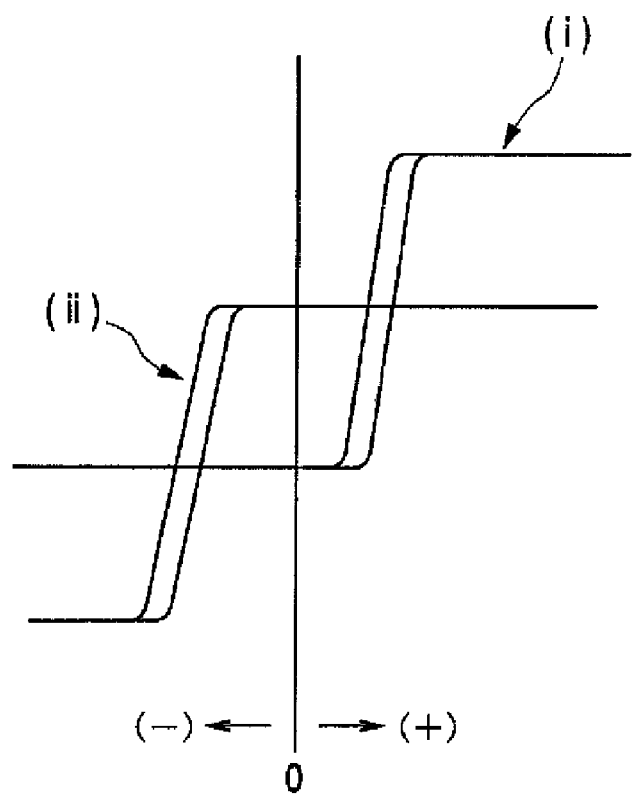
FIG. 8 is a characteristic diagram of a first magneto-resistance layer and a second magneto-resistance layer according to embodiment 2.

In FIG. 8, Diagram (i) represents changes of the resistances of the first magneto-resistance layers 111 and 112 when the external magnetic field is applied, and Diagram (ii) represents changes of the resistances of the second magneto-resistance layers 121 and 122 when the external magnetic field is applied. A longitudinal axis represents the resistances of the magneto-resistance layers, and a horizontal axis represents the strength of the magnetic field.

As shown in FIG. 8, when the strength of the magnetic field applied to the magnetic detection device 101 in the positive direction is more than a predetermined value, the resistances of the first magneto-resistance layers 111 and 112 increases without the variation of the resistances of the second magneto-resistance layers 121 and 122. Accordingly, when the magnetic field is applied in the positive direction, the second magneto-resistance layers 121 and 122 function as reference resistance, and when the strength of the magnetic field in the positive direction is equal to or more than the predetermined value, the voltage of the first output (OUT1) decreases and the voltage of the second output (OUT2) increases. As shown in the circuit diagram of FIG. 6, a voltage variation being two times in comparison with the first output (OUT1) or the second output (OUT2) can be obtained by a differential amplifier 4.

As shown in FIG. 8, when the strength of the magnetic field applied to the magnetic detection device 101 in the negative direction is more than a predetermined value, the resistances of the second magneto-resistance layers 121 and 122 decrease without the variation of the resistances of the first magneto-resistance layers 111 and 112. Accordingly, when the magnetic field is applied in the negative direction, the first magneto-resistance layers 111 and 112 function as the reference resistance. As in the case of the magnetic field in the positive direction, when the magnetic field in the negative direction is equal to or more than the predetermined value, the voltage of the first output (OUT1) decreases and the voltage of the second output (OUT2) increases. As shown in FIG. 6, the voltage variation being two times in comparison with the first output (OUT1) or the second output (OUT2) can be obtained by the differential amplifier 4.

That is, the magnetic detection device 101 can output the same magnetic detection when the magnetic field is applied in the positive direction and is applied in the negative direction.

As shown in FIG. 4, the power supply layer 31 is connected with one end 111a of the first magneto-resistance layer 111 and one end 121a of the second magneto-resistance layer 122. The grounding layer 32 is connected with the other end 121b of the second magneto-resistance layer 121 and the other end 112b of the first magneto-resistance layer 112.

As shown in FIG. 4, the first magneto-resistance layer 111 has a linear portion 111b extending in the Y2 direction, and the second magneto-resistance layer 121 also has a linear portion 121b extending in the Y1 direction. A first output conductive layer 133 has a linear portion 133a extending parallel to the linear portion 111b with a gap therebetween and a linear portion 133b extending parallel to the linear portion 121b with a gap therebetween. A connection layer 135 connects the linear portion 111b to the linear portion 133a, and a connection layer 136 connects the linear portion 121b to the linear portion 133b.

The second magneto-resistance layer 122 has a linear portion 122b extending in the Y2 direction, and the first magneto-resistance layer 112 has a linear portion 112a extending in the Y1 direction. A second output conductive layer 134 has a linear portion 134a extending parallel to the linear portion 122b with a gap therebetween, and a linear portion 134b extending parallel to the linear portion 112a with a gap therebetween. A connection layer 137 connects the linear portion 122b to the linear portion 134a, and a connection layer 138 connects the linear portion 112a to the linear portion 134b.

As shown in FIG. 4, positions of the connection layers 135, 136, 137 and 138 are selectable as expressed by dotted lines. As a result, it is possible to adjust the resistances of both the first magneto-resistance layers 111 and 112 and the second magneto-resistance layers 121 and 122 when the magnetic field is not applied.

In the embodiment of FIG. 1, the resistances of the reference resistance layers 21 and 22 is adjusted. However, the resistances of the magneto-resistance layers 11 and 12 may be adjusted, and the resistances of both the reference resistance layers 21 and 22 and the magneto-resistance layers 11 and 12 may be simultaneously adjusted. In embodiment of FIG. 4, the resistances of only the first magneto-resistance layers 111 and 112 may be adjusted and the resistances of only the second magneto-resistance layers 121 and 122 may be adjusted.

FIG. 9 is a cross-sectional view illustrating a modified example of embodiment 1 shown in FIGS. 1 to 3. In FIG. 9 reference numerals are commonly denoted as those in the embodiment 1, and the detailed description thereof is omitted.

In this magnetic detection device 201, the cover layer 18 is formed on the reference resistance layer 21, and the linear portion 33a of the first output conductive layer 33 is formed on the cover layer 18. The linear portion 33a of the first output conductive layer 33 overlaps with the reference resistance layer 21 with a gap therebetween in a thickness direction of both layers. The linear portion 33a of the first output conductive layer 33 is parallel to the reference resistance layer 21.

The reference resistance layer 21 is connected to the linear portion 33a of the first output conductive layer 33 via a connection layer 35d. The connection layer 35d is selectably disposed in any one position in a longitudinal direction of the reference resistance layer 21 as embodiment shown in FIG. 1. By selecting the position of the connection layer 35d, resistance ratio of the magneto-resistance layer 11 to the reference resistance layer 21 can be reasonably determined.

The connection layer 35d may be integrally formed with the linear portion 33a of the first output conductive layer 33, and may be formed separately. As shown in the embodiment in FIG. 1, the position in which the connection layer 35d is formed is determined in the unit of lot in advance. The part of the cover layer 18 is removed by the milling and the etching in the position, and the connection layer 35d is formed therein. The linear portion 33a is formed thereon.

In the embodiment shown in FIG. 4, the linear portion 133b may also overlap with the second magneto-resistance layer 121 in a direction of their thicknesses, and the connection layer may be formed in a process before the linear portion 133b is not formed.

In the embodiments, resistances of the layers can be adjusted without causing damages to the magneto-resistance layers and the reference resistance layers having the multilayer laminated structure.

What is claimed is:

1. A magnetic detection device comprising:
a magneto-resistance layer having a variable electric resistance in accordance with an external magnetic field; and
the magneto-resistance layer being connected in series to a reference resistance layer having a fixed electric resistance under the external magnetic field, a voltage is applied to the magneto-resistance layer and the reference resistance layer connected in series to each other, and
an output conductive layer that outputs a central potential between the magneto-resistance layer and the reference resistance layer,
wherein the output conductive layer extends along at least one of the magneto-resistance layer and the reference resistance layer with a gap therebetween,
wherein the output conductive layer is electrically connected to at least one of the magneto-resistance layer and the reference resistance layer via a conductive connection layer,
wherein the position of the connection layer is selectable, and
wherein the magneto-resistance layer comprises:
a fixed magnetic layer of which the magnetization direction is fixed,
a free magnetic layer of which the magnetization direction varies with the external magnetic field, and
a non-magnetic conductive layer disposed between the fixed magnetic layer and the free magnetic layer,
wherein the reference resistance layer has reverse lamination order with the non-magnetic conductive layer and the free magnetic layer in comparison with the magneto-resistance layer.

2. A magnetic detection device, comprising:
a first magneto-resistance layer having variable electric resistances in accordance with an external magnetic field,
a second magneto-resistance layer having the variable electric resistances in accordance with the external magnetic field being connected to the first magneto-resistance layer in series, a voltage is applied to the first magneto-resistance layer and the second magneto-resistance layer connected in series to each other, and
an output conductive layer that outputs a central potential between the first magneto-resistance layer and the second magneto-resistance layer,
wherein the output conductive layer extends along at least one of the first magneto-resistance layer and the second magneto-resistance layer and is parallel to at least one of the first magneto-resistance layer and the second magneto-resistance layer with a gap therebetween,
wherein the output conductive layer is electrically connected to at least one of the first magneto-resistance layer and the second magneto-resistance layer via a conductive connection layer,
wherein the position of the connection layer is selectable, and
wherein when the first magneto-resistance layer has a magnetic field in a first direction, the electric resistance thereof varies, and when the first magneto-resistance layer has a magnetic field in a second direction opposite to the first direction, the electric resistance thereof does not vary, and
wherein when the second magneto-resistance layer has a magnetic field in the second direction, the electric resistance thereof varies, and when the second magneto-resistance layer has a magnetic field in the first direction, the electric resistance thereof does not vary.

* * * * *